(12) United States Patent
Wu

(10) Patent No.: US 8,284,695 B2
(45) Date of Patent: *Oct. 9, 2012

(54) METHOD AND APPARATUS FOR CONFIGURING AND MANAGING CUSTOMER PREMISES EQUIPMENTS

(75) Inventor: Huangwei Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/342,740

(22) Filed: Jan. 3, 2012

(65) Prior Publication Data

US 2012/0117206 A1 May 10, 2012

Related U.S. Application Data

(63) Continuation of application No. 12/468,734, filed on May 19, 2009, now Pat. No. 8,116,221, which is a continuation of application No. PCT/CN2007/070931, filed on Oct. 19, 2007.

(30) Foreign Application Priority Data

Nov. 20, 2006 (CN) .......................... 2006 1 0149727

(51) Int. Cl.
*G01R 31/08* (2006.01)
(52) U.S. Cl. ..................... 370/252; 370/254; 709/220
(58) Field of Classification Search .................. 370/252, 370/254, 395.21, 352, 401; 375/222; 709/217, 709/219, 220, 223, 228
See application file for complete search history.

(56) References Cited

U.S. PATENT DOCUMENTS 5,832,503 A 11/1998 Malik et al.
6,052,720 A 4/2000 Traversat et al.
(Continued)

FOREIGN PATENT DOCUMENTS

CN 1741462 3/2006
(Continued)

OTHER PUBLICATIONS

Office Action issued in corresponding Chinese Patent Application No. 200610149727.1, mailed Mar. 24, 2011.

(Continued)

*Primary Examiner* — Jung Park
(74) *Attorney, Agent, or Firm* — Brinks Hofer Gilson & Lione

(57) ABSTRACT

A method and apparatus for configuring and managing customer premises equipments (CPE) are disclosed. The method includes obtaining information of the data model supported by the CPE; extracting the CPE data model and the relationship between the CPE data model and the CPE from the obtained information; finding the data model supported by a specific CPE according to the relationship between the CPE data model and the CPE; and configuring and managing the specific CPE according to the found data model of the CPE. The present invention is able to configure and manage a specific CPE based on CPE data model by associating in advance the CPE data model with the device class information of the CPE and finding the data model of the CPE based on the device class information of the CPE.

8 Claims, 2 Drawing Sheets

U.S. PATENT DOCUMENTS

| | | |
|---|---|---|
| 7,720,002 B1 | 5/2010 | Beser |
| 2005/0138164 A1 | 6/2005 | Burton et al. |
| 2006/0112169 A1 | 5/2006 | Bodlaender et al. |
| 2006/0227722 A1 | 10/2006 | Michel et al. |
| 2007/0025341 A1 | 2/2007 | Baigal et al. |
| 2008/0010358 A1 | 1/2008 | Jin |
| 2009/0207985 A1 | 8/2009 | Cioffi et al. |

FOREIGN PATENT DOCUMENTS

| | | |
|---|---|---|
| CN | 1741462 A | 3/2006 |
| CN | 1745566 A | 3/2006 |
| CN | 1859160 | 11/2006 |
| CN | 1859160 A | 11/2006 |
| CN | 1859722 | 11/2006 |
| CN | 1859722 A | 11/2006 |
| EP | 1 667 359 A1 | 6/2006 |
| EP | 1667359 A1 | 6/2006 |
| WO | WO 2008/061465 A1 | 5/2008 |

OTHER PUBLICATIONS

Extended European Search Report issued in corresponding European Patent Application No. 07817122.0, mailed Dec. 15, 2009.

International Search Report, International Preliminary Report on Patentability and Written Opinion of the International Searching Authority issued in corresponding PCT Patent Application No. PCT/CN2007/070931, mailed Jan. 10, 2008.

Office Action issued Apr. 6, 2011, in commonly owned U.S. Appl. No. 12/468,734, filed May 19, 2009.

Bernstein and Spets, Editors, "CPE WAN Management Protocol" Technical Report DSL Forum TR-069. DSLHome-Technical Working Group, May 2004. XP-002316355.

Bernstein Spets and Bouchat, Editors, "Data Model Template for TR-069-Enabled Devices" Technical Report DSL Forum TR-106. DSLHome-Technical Working Group, Sep. 2005. XP-002386137.

Office Action issued in corresponding Chinese Patent Application No. 200610149727.1; mailed Mar. 24, 2011.

Berstein, Jeff et al. "DSL Forum TR-106: Data Model Template for TR-069 Enabled Devices" Technical Report DSL Forum; Sep. 2005:1-29.

Berstein, Jeff et al "CPE WAN Management Protocol" DSL Home—Technical Working Group. May 2004:1-109.

Extended European Search Report issued in corresponding European Patent Application No. 07 81 7122; mailed Dec. 15, 2009.

International Preliminary Report on Patentability issued in corresponding PCT Application No. PCT/CN2007/070931; issued May 26, 2006.

METHOD AND APPARATUS FOR CONFIGURING AND MANAGING CUSTOMER PREMISES EQUIPMENTS

CROSS-REFERENCE TO RELATED APPLICATIONS

This application is a continuation of U.S. patent application Ser. No. 12/468,734, filed on May 19, 2009, which has been issued as U.S. Pat. No. 8,116,221, which is a continuation of International Application No. PCT/CN2007/070931, filed on Oct. 19, 2007. The International Application claims the benefit of Chinese Patent Application No. 200610149727.1, filed on Nov. 20, 2006, all of which are hereby incorporated by reference in their entireties.

FIELD OF THE DISCLOSURE

The present disclosure relates to communication field, and more specifically, to method and apparatus for configuring and managing customer premises equipments.

BACKGROUND

Digital Subscriber Line (DSL) is a broadband access technique. DSL has gained wide popularity in hundreds of thousands of households. A typical DSL networking is illustrated in FIG. 1. The extensive applications of DSL technique, such as Voice over IP (VoIP), IP Television (IPTV), have broadened the application field for broadband technology. Various IP based devices have come into existence based on these applications or combination thereof. The IP application terminals now come into use in the households are called Customer Premises Equipments (CPEs), which are configured automatically by an Auto-Configuration Server (ACS). Accordingly, the CPE may operate normally in absence of a user's configuration.

A series of technical documents proposed regarding CPE specify a data model supported by CPE and parameters that the CPE must support and parameters that the CPE may support by option. For a particular type of CPE, such as a particular model from a particular manufacturer, a particular software version and one or more type of the particular hardware version, the data model of those may be the same. To operate a specific CPE, the ACS has to know about the data model of the CPE and a Remote Procedure Call (RPC) method supported by CPE so that it may operate and configure the CPE without error.

However, there are no good solutions so far to handle the issue as to how an ACS obtains the data model supported by the CPE and the RPC method supported by CPE as well as how the ACS associates a specific CPE with the specific Data model supported by the specific CPE and RPC method supported by CPE on the ACS. Currently, the ACS employs a GetParameterNames RPC method to directly obtain parameters supported by the CPE and the read/write property of these parameters from the CPE. However, such an RPC method is confronted with two issues.

The first issue is that the data model obtained using such method is incomplete. The data model does not include the type and range of the parameters supported by the CPE.

The second issue is that, according to the method, the ACS has to obtain the data model of each CPE every time the ACS operates a CPE. Even though these CPEs have the same data model, the workload of the ACS may be increased.

SUMMARY

A method for configuring and managing customer premises equipments (CPE) is provided according to one embodiment of the present invention. The method includes: obtaining data model information supported by the CPE; and configuring and managing the CPE based on the data model information supported by the CPE according to device class information of the CPE.

An apparatus for configuring and managing customer premises equipments (CPE) is further provided according to one embodiment of the present invention. The apparatus includes: a CPE data model information obtaining module, configured to obtain the data model information supported by the CPE; and a CPE configuration module, configured to configure and manage the CPE based on the data model information supported by the CPE according to device class information of the CPE.

As can be seen from the solutions provided by the present invention, embodiments of the present invention are able to configure and manage a specific CPE based on a data model supported by the specific CPE by obtaining data model information of the CPE.

DETAILED DESCRIPTION

A method for configuring and managing customer premises equipments is provided according to one embodiment of the present invention. An Automatic-configuration Server (ACS) obtains data model information of the customer premises equipment (CPE), and extracts, from the obtained information, the data model supported by the CPE and a relationship between the data model and the CPE. The ACS obtains the data model of a particular CPE based on the relationship so that the ACS may perform configuration and management for the CPE.

Figure 1:
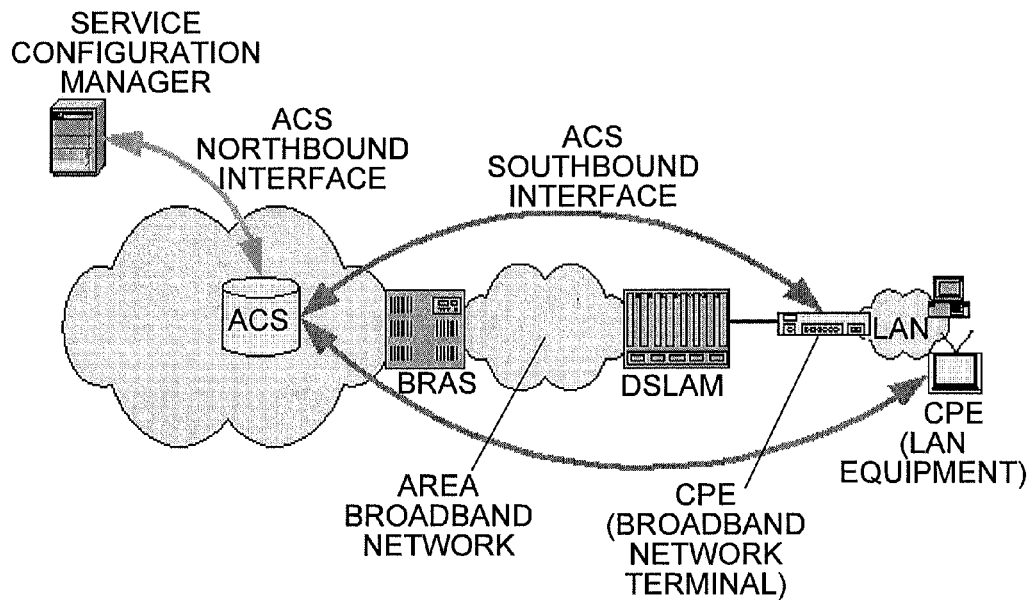
FIG. 1 illustrates architecture of DSL networking in the prior art.
Figure 2:
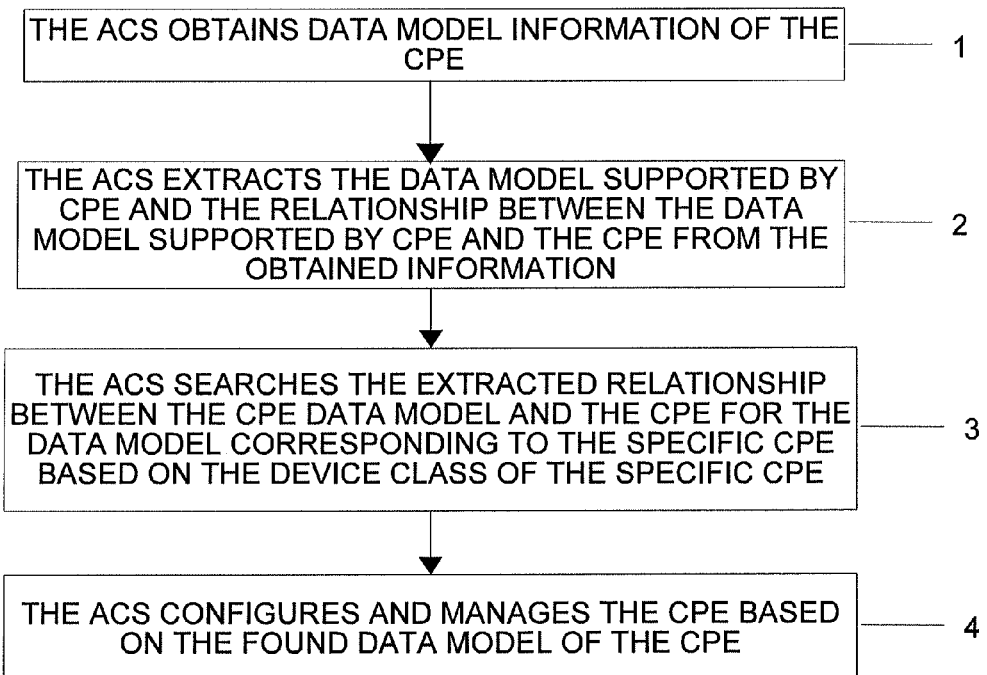
FIG. 2 illustrates a flowchart of an exemplary method according to one embodiment of the present invention.

FIG. 2 illustrates a flowchart of an exemplary method for configuring and managing CPE according to one embodiment of the present invention. The method includes the following steps.

At step 1, the ACS obtains data model information of the CPE.

The data model information of a particular type of CPE obtained by the ACS may include parameters supported by this type of CPE, and type and range of the parameters. The data model information may further include an RPC method supported by this type of CPE, arguments of the RPC method, type and range of the arguments, and RPC call return information. Additionally or alternatively, the data model information may further include device class information of the specific CPE, such as device type information of the CPE or device ID information of the CPE. CPEs having the same device class may be managed with a same data model.

Specifically, Extensible Markup Language (XML) can be used to describe the above information, which is illustrated below.

```
<DeviceIdentification>
  <IDName>Manufacture</IDName>
  <IDType> string </IDType>
```

-continued

```
<Value>Gamebox</Value>
<IDName>MajorSoftwareVersion</IDName>
    <IDType> unsignedInt </IDType>
<Value>2</Value>
<IDName>MinorSoftwareVersion</IDName>
    <IDType> unsignedInt </IDType>
<Value>10</Value>
</DeviceIdentification>
<parameters>
    <parameter>
        <parameterName>InternetGatewayDevice</parameterName>
            <parameterType>object</parameterType>
        <array>false</array>
        <parameters>
            <parameter>
                <parameterName>LANDeviceNumberOfEntries
                </parameterName>
                    <parameterType>unsignedInt</parameterType>
                    <minValue>0</minValue>
                    <maxValue>4</maxValue>
            </parameter>
            <parameter>
                <parameterName>WANDeviceNumberOfEntries
                </parameterName>
                <parameterType>unsignedInt</parameterType>
            </parameter>
            <parameter>
                <parameterName>DeviceInfo</parameterName>
                <parameterType>object</parameterType>
                <array>false</array>
                <parameters>
                    <parameter>
                        <parameterName>Manufacturer</parameterName>
                        <parameterType>string</parameterType>
                        <parameterLength>64</parameterLength>
                    </parameter>
                    <parameter>
                        <parameterName>UpTime</parameterName>
                        <parameterType>unsignedInt</parameterType>
                    </parameter>
                    <parameter>
                        <parameterName>VendorConfigFile</parameterName>
                        <parameterType>object</parameterType>
                        <array>true</array>
                        <parameters>
                            <parameter>
                                <parameterName>Name</parameterName>
                                <parameterType>string</parameterType>
                                <parameterLength>64</parameterLength>
                            </parameter>
                        </parameters>
                    </parameter>
                </parameters>
            </parameter>
        </parameters>
    </parameter>
</parameters>
```

In the above example, the device class information of the specific type of CPE includes Manufacture, MajorSoftwareVersion, and MinorSoftwareVersion. The device class information requires the value of "Manufacture" to be "Gamebox", the value of "MajorSoftwareVersion" to be 2, and the value of "MinorSoftwareVersion" to be 10, which is abbreviated as "Gamebox 2.10" in the below description.

The ACS may obtain the information via a Northbound Interface (NBI) of the ACS, or obtain the information from a network based on a Uniform Resource Locator (URL) reported by the CPE. The URL reported by the CPE points to a location in the network where the data model information supported by the CPE is stored. The data model information supported by the CPE described by the URL is located at a server in the network or at the CPE.

At step 2, the ACS extracts the data model supported by the CPE and the relationship between the data model supported by the CPE and the CPE from the obtained information, and stores the data model supported by the CPE and the relationship.

The ACS may employ an existing XML parsing technique to extract the data model of this type of CPE from the information obtained at step 1. If the obtained information includes an RPC method supported by CPE, the ACS may extract the RPC method supported by this type of CPE from the obtained information.

If the information obtained at step 1 further includes device class information of this type of CPE, e.g., device type or device ID information, the ACS may obtain such information using an XML parsing technique. If the information obtained at step 1 does not include device class information of the particular type of CPE, the device class information of the CPE corresponding to the data model needs to be obtained from the northbound interface of the ACS, or from the CPE.

The relationship between data model supported by the CPE and CPE refers to the association between data model supported by the CPE and the device class information of the CPE.

The ACS stores the relationship between the data model supported the CPE and the device class information of CPE. For instance, in the example illustrated in step 1, suppose the data model supported by the CPE extracted by ACS is named as terminal data model NO. 133, then ACS may further need to record the device class information, "Gamebox 2.10", which corresponds to the terminal data model NO. 133.

The related CPE data model and the relationship between the data model and the device class information stored in ACS can be deleted under a particular circumstance, for instance, some outdated CPE model or CPE data model which has been updated already.

At step 3, the ACS searches the stored relationship between the CPE data model and the CPE for the data model corresponding to the specific CPE based on the device class identifier of the specific CPE.

For a specific CPE, the ACS searches the stored relationship between the data model of the CPE and the CPE for the data model corresponding to the CPE based on the device class identifier. If a RPC method supported by the CPE is also extracted at step 2, the ACS is also able to retrieve the corresponding RPC method supported by this CPE.

For instance, assume that the device ID of a specific CPE is "GameBox 2.10," the ACS may obtain the terminal data model NO. 133 at ACS which is the data model of this CPE.

At step 4, the ACS configures and manages the CPE based on the found data model of the CPE.

The ACS configures and manages the CPE based on the found data model of the CPE. The configuration and management process are known by those skilled in the art, which is omitted herein for clarity.

Figure 3:
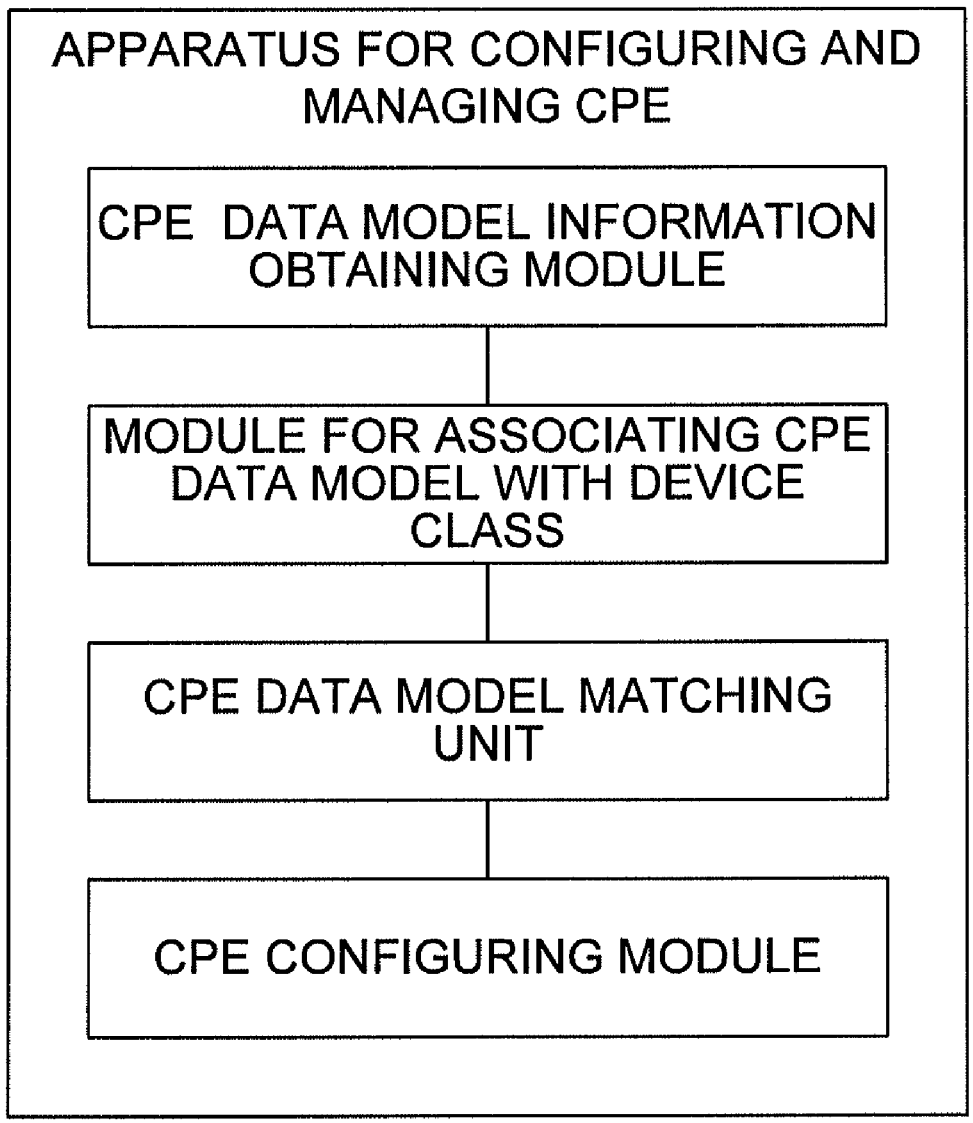
FIG. 3 illustrates a block diagram of an exemplary apparatus according to one embodiment of the present invention.

An apparatus for configuring and managing CPE is provided according to one embodiment of the present invention. The apparatus may be disposed in the ACS. FIG. 3 illustrates an exemplary block diagram of the apparatus. Specifically, the apparatus includes the following elements.

1) a CPE data model information obtaining module, configured to obtain the data model information of the CPE.

In one embodiment of the present invention, the data model information of the CPE may include parameters supported by CPE, and type and range of the parameters.

The data model information of the CPE may further include an RPC method supported by CPE and arguments, argument type, range and RPC call return information regarding the RPC method.

The data model information of the CPE may further include device class information of the CPE.

2) a module for associating CPE data model with device class identifier, configured to extract the data model supported by the CPE and device class information of the CPE according to the data model information of the CPE obtained by the CPE data model information obtaining module, and further configured to associate the device class information of the CPE with its corresponding CPE data model.

3) a CPE data model matching module, configured to search for the CPE data model associated with the device class of the CPE based on the device class of the CPE extracted by the module for associating the CPE data model with device class.

4) a CPE configuration module, configured to configure and manage a specific CPE according to the CPE data model found by the CPE data model matching module.

In summary, the present invention is able to configure and manage a specific CPE based on CPE data model by obtaining CPE data model and RPC method supported by CPE, and associating in advance the CPE data model with the device class information of the CPE and finding the data model of the CPE based on the device class information of the CPE.

The foregoing is merely exemplary embodiments of the present invention, while the scope of the present invention is not so limited. Any variations or equivalents can be readily appreciated by those skilled in the art. These variations or equivalents shall be construed as fall within the scope of the present invention. Therefore, the scope of the present invention should be determined by the scope of the claims.

What is claimed is:

1. A method for managing custom premises equipment (CPE), comprising:
    obtaining data model information supported by the CPE;
    extracting data model supported by the CPE from the data module information;
    obtaining a relationship between the CPE and the data model supported by the CPE according to the data model and device class information of the CPE, wherein before the obtaining of the data model information:
        searching for a relationship between the CPE and the data model supported by the CPE according to the device class information of the CPE; and
        confirming that the relationship between the CPE and the data model supported by the CPE is not stored;
    managing the CPE based on the data model information supported by the CPE according to device class information of the CPE.

2. The method of claim 1, wherein the obtaining of the data model information supported by the CPE, comprising at least one of:
    obtaining the data model information supported by the CPE via a northbound interface of an auto-configuration server, ACS; or
    obtaining the data model information supported by the CPE from a network based on a uniform resource locator reported by the CPE.

3. The method of claim 2, wherein the obtaining of the data model information supported by the CPE from a network based on a uniform resource locator reported by the CPE, comprising at least one of:
    obtaining the data model information supported by the CPE according to the uniform resource locator from a server in the network; or
    obtaining the data model information supported by the CPE according to the uniform resource locator from the CPE.

4. The method of claim 1, wherein the data model information supported by the (CPE), comprising at least one of:
    parameters and parameters types, which are supported by the CPE,
    a Remote Procedure Call (RPC) method, arguments of the RPC method, argument type, range and RPC call return information regarding the RPC method, all of which are supported by the CPE, wherein the RPC method further comprising:
        extracting the RPC method from the data model information, if the data model information comprises the RPC method.

5. The method of claim 4, wherein the data model information supported by the CPE comprises:
    range of the parameters or device class information of the CPE; and
    the RPC method further comprising:
        extracting the device class information from the data model information if the data model information comprises the device class information.

6. An apparatus for managing custom premises equipments (CPE), wherein the apparatus comprises:
    a CPE data model information obtaining module, configured to obtain data model information supported by the CPE;
    a data model extracting module, configured to extract data model from the data model information, wherein the data model is supported by the CPE;
    a relationship obtaining module, configured to obtain a relationship between the CPE and the data model according to the data model and device class information of the CPE;
    a search module, configured to search for the relationship between the CPE and the data model according to the device class information of the CPE; and
    a confirming module, configured to confirm that the relationship between the CPE and the data model is not stored; and
    a CPE configuration module, configured to manage the CPE based on the data model information according to the device class information of the CPE.

7. An apparatus for managing custom premises equipments (CPE), wherein the apparatus comprises:
    a CPE data model information obtaining module, configured to obtain data model information supported by the CPE, wherein the data model information comprises at least one of the followings:
        parameters and parameter types, which are supported by the CPE,
        a Remote Procedure Call (RPC) method, arguments of the RPC method, argument type, range and RPC call return information regarding the RPC method, all of which are supported by the CPE, or
        range of the parameters or device class information of the CPE;
    an RPC extracting module, configured to extract the RPC method from the data model information, if the data model information comprises the RPC method;
    an device class information extracting module, configured to extract the device class information from the data model information, if the data model information includes the device class information; and
    a CPE configuration module, configured to manage the CPE based on the data model information according to the device class information.

8. The method of claim 3, wherein the uniform resource locator references an Extensible Markup Language file which describes data model supported by the CPE.

* * * * *